United States Patent [19]

Hirukawa et al.

[11] Patent Number: 5,072,629
[45] Date of Patent: Dec. 17, 1991

[54] SHIFT ASSISTING SYSTEM

[75] Inventors: Itsushi Hirukawa; Ryoichi Ito, both of Hamamatsu, Japan

[73] Assignee: Sanshin Kogyo Kabushiki Kaisha, Hamamatsu, Japan

[21] Appl. No.: 577,872

[22] Filed: Sep. 5, 1990

[30] Foreign Application Priority Data

Sep. 5, 1989 [JP] Japan .................................. 1-229656

[51] Int. Cl.⁵ ............................................. B63H 21/21
[52] U.S. Cl. .......................................... 74/851; 338/47
[58] Field of Search ............................ 74/851; 338/47

[56] References Cited

U.S. PATENT DOCUMENTS

| | | | |
|---|---|---|---|
| 4,262,622 | 4/1981 | Dretzka et al. | 74/851 X |
| 4,270,414 | 6/1981 | Tellert | 74/851 X |
| 4,525,149 | 6/1985 | Broughton et al. | 74/851 X |
| 4,748,433 | 5/1988 | Jackson et al. | 338/47 X |
| 4,973,274 | 11/1990 | Hirukawa | 74/851 X |

FOREIGN PATENT DOCUMENTS 2307001  2/1973  Fed. Rep. of Germany ........ 338/47

Primary Examiner—Allan D. Herrmann
Assistant Examiner—William O. Trousdell
Attorney, Agent, or Firm—Ernest A. Beutler

[57] ABSTRACT

A shift assisting mechanism for assisting the shifting of a dog clutch of a marine transmission by reducing the engine speed. The requirement for engine speed reduction is sensed by a pressure sensitive conductive rubber type pressure sensing switch contained within the interconnection between the operator and the dog clutch.

5 Claims, 3 Drawing Sheets

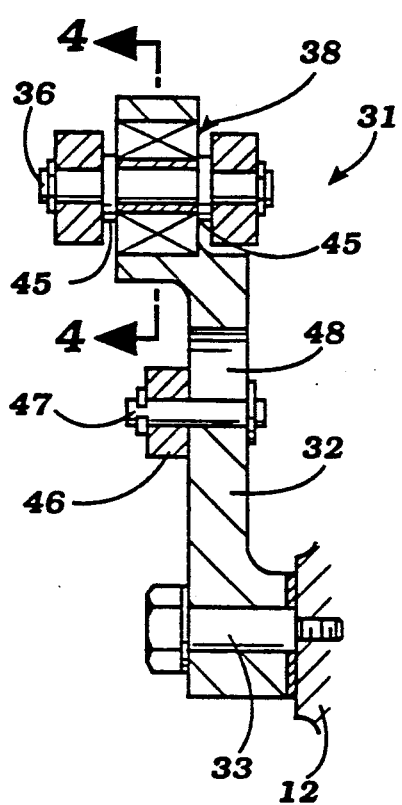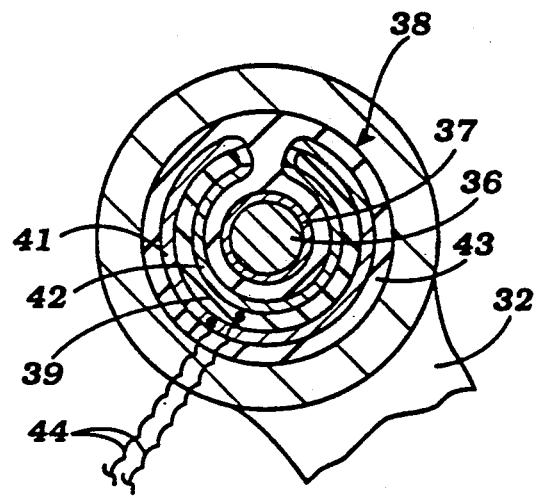

SHIFT ASSISTING SYSTEM

BACKGROUND OF THE INVENTION

This invention relates to a shift assisting system and more particularly to an improved construction for assisting the shifting of a transmission containing a dog clutching element by reducing the engine speed during shifting operation.

Many types of transmission applications employ dog clutching elements for transmitting power. For example, marine propulsion transmissions generally include a bevel gear type of forward, neutral, reverse transmission that includes a dog clutching element that is selectively engageable with either of two counterrotating bevel gears so as to drive a propulsion shaft in selected forward or reverse directions. Although such types of transmissions offer the advantage of being able to transmit large amounts of power, the shifting of the transmission frequently presents difficulties. In order to assist in shifting such transmissions, it has been the practice to employ some device for sensing a shifting condition and reducing the engine power by reducing its speed during shifting.

Substantially all of the prior art mechanisms employed for this purpose require some form of lost motion in order to sense a shifting condition when power reduction is required. These types of devices obviously add to the complexity of the system. Also, due to their inherent introduction of lost motion into the shift mechanism, they make the shifting operation less exact than is desirable.

It is, therefore, a principal object of this invention to provide an improved shift assisting system.

It is a further object of this invention to provide a shift assisting system which does not require lost motion in order to determine when a shift assist is required.

It is a further object of this invention to provide a shift assisting mechanism using a pressure sensitive conductive rubber for sensing when shift assist is required.

SUMMARY OF THE INVENTION

This invention is adapted to be embodied in a shift assisting mechanism for assisting the shifting of a dog clutch of a transmission driven by an internal combustion engine by reducing the speed of the engine. The transmission comprises a control member selectively movable by an operator for selecting a shift, an actuator for moving the dog clutch to the shift condition and interconnecting means between the control member and the actuator for transmitting motion therebetween. A pressure sensitive type device is provided for measuring a predetermined resistance of movement of the dog clutch to its shift position for actuating the shift assisting mechanism.

BRIEF DESCRIPTION OF THE DRAWINGS

FIG. 3 is a cross-sectional view taken along the line 3—3 of FIG. 2.

FIG. 4 is a cross-sectional view taken along the line 4—4 of FIG. 3.

DETAILED DESCRIPTION OF THE PREFERRED EMBODIMENT

Figure 1:
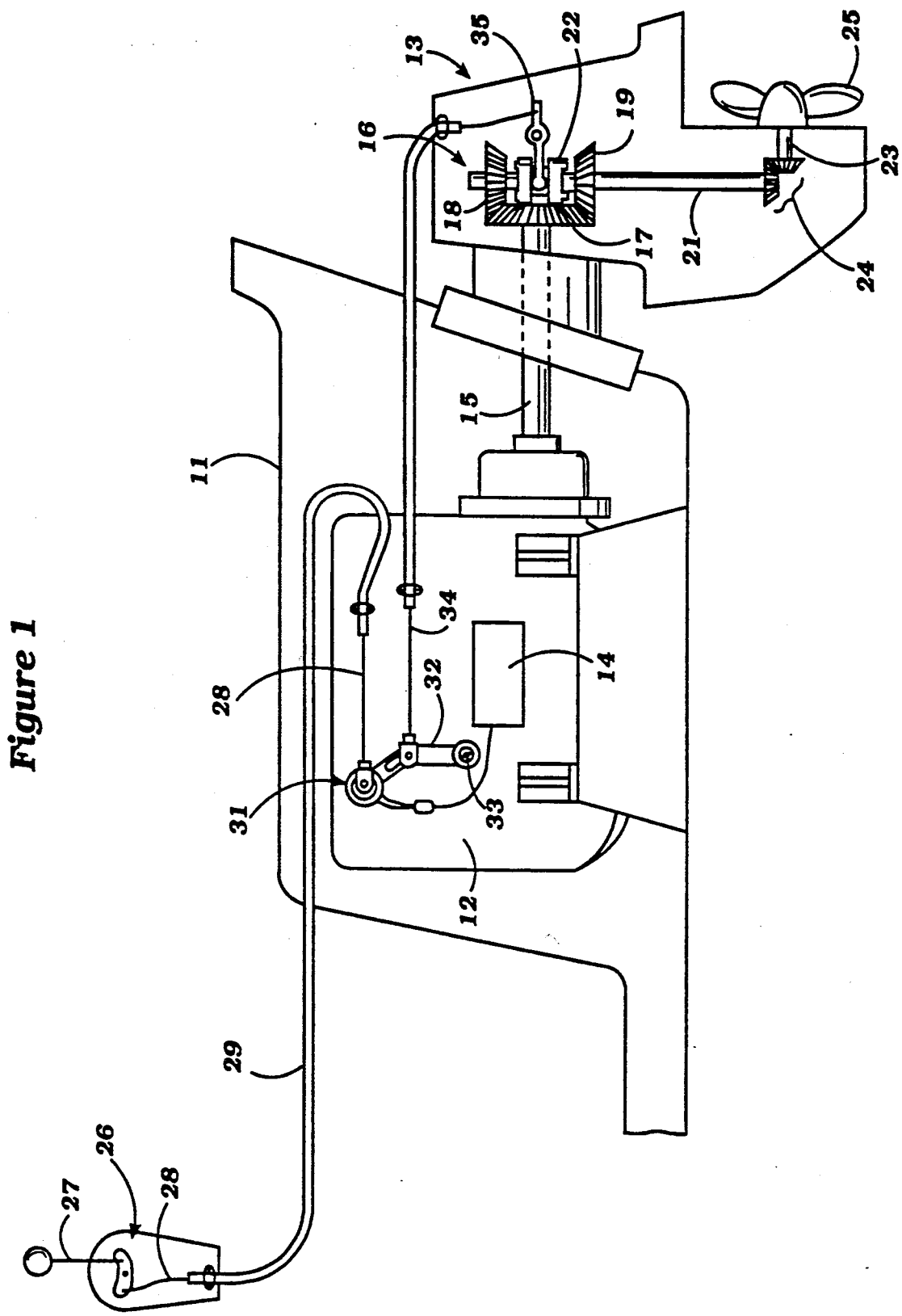
FIG. 1 is a partial side elevational view of a watercraft having a shift assisting mechanism constructed in accordance with an embodiment of the invention.

Referring first to FIG. 1, a portion of the hull of a watercraft having a shift assist mechanism constructed in accordance with an embodiment of the invention is identified generally by the reference numeral 11. The watercraft 11 is, in the illustrated embodiment, propelled by an inboard/outboard type of propulsion unit consisting of an internal combustion engine 12 and an outdrive 13. Although the invention is described in conjunction with such a power unit, it will be understood by those skilled in the art that the invention can be utilized in other types of marine transmission such as outboard motors per se. In fact, certain facets of the invention have application and uses other than marine applications.

The engine 12 is, in the illustrated embodiment, of the spark ignited type and includes an ignition system having a controller 14. The engine 12 drives an output shaft 15 which is coupled to an input shaft of the outdrive unit 13 through an universal connection (not shown) so as to accommodate steering and tilt and trim movement of the outdrive 13. Since this construction forms no part of the invention, it has not been illustrated and any of the conventional structure well known in the art may be employed.

The shaft 15 drives a forward, neutral, reverse transmission, indicated generally by the reference numeral 16 and which comprises a driving bevel gear 17 that is affixed for rotation with the input shaft 15. A pair of driven bevel gears 18 and 19 are journaled on a drive shaft 21 which is journaled in the outdrive 13 for rotation about a vertically extending axis. A dog clutching element 22 has a splined connection with the drive shaft 21 and is axially movable therealong for selective engagement with one of the gears 18 or 19 so as to rotate the shaft 21 in selected forward and reverse directions. Since this type of transmission is well known, further description of it is not believed to be necessary to enable those skilled in the art to practice the invention.

The drive shaft 21 has affixed to its lower end a bevel gear that drives a corresponding bevel gear affixed to a propeller shaft 23. This pair of bevel gears is indicated by the reference numeral 24. A propeller 25 is affixed to the propeller shaft 23 for propelling the hull 11 in selected forward or reverse directions.

Positioned at an appropriate location within the hull of the watercraft 11 is a transmission selector 26 that is comprised of a shift lever 27 that is connected to one end of a flexible transmitter 28. The transmitter 28 is slidably supported in a protected sheath 29 and its opposite end is connected to a shift sensing device, indicated generally by the reference numeral 31 which, in turn, connects it to a lever 32 that is pivotally supported on the side of the engine 12 by means of a pivot pin 33. A further wire actuator 34 is connected at one end to the lever 32 in a manner to be described and at its other end to a bellcrank 35 that is mounted within the outdrive unit 13. Pivotal movement of the lever 35 will actuate the dog clutching sleeve 22 into engagement with either the gears 18 or 19, as aforenoted.

Figure 2:
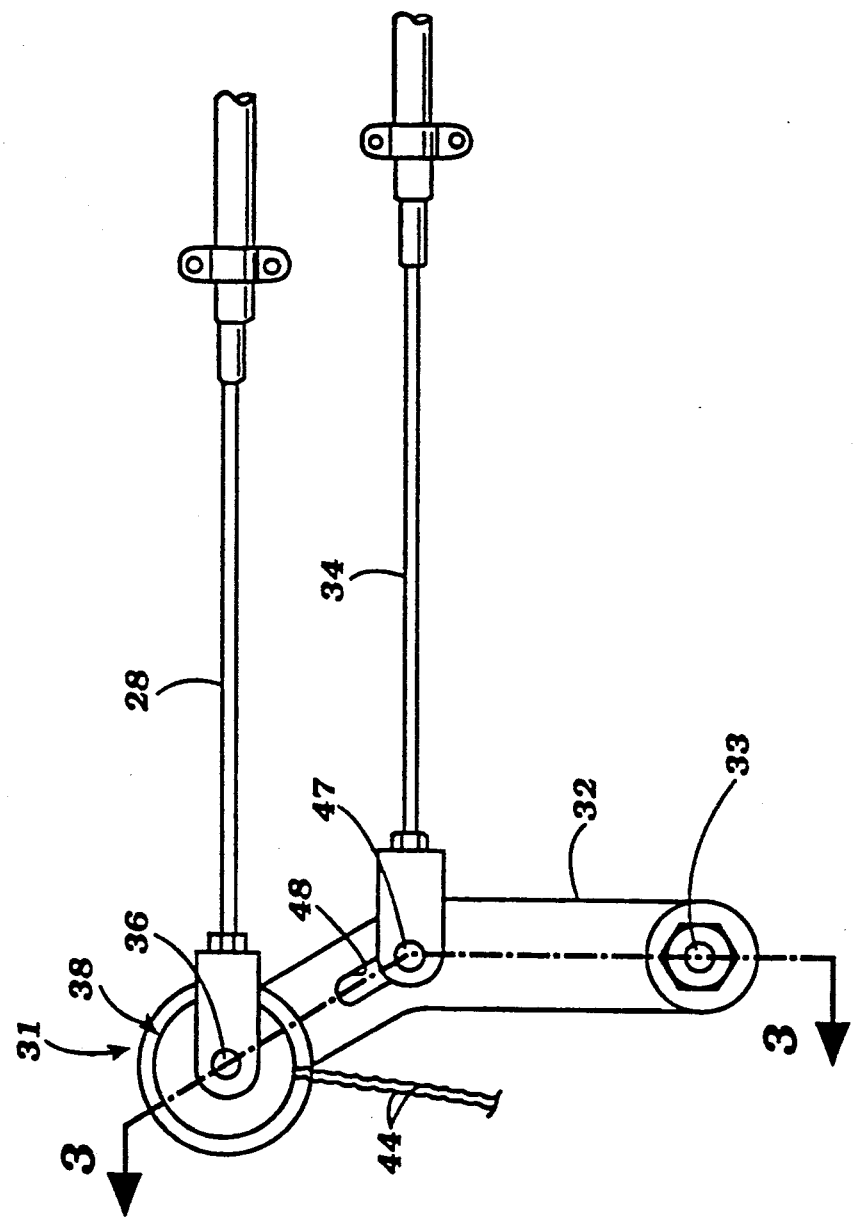
FIG. 2 is an enlarged side elevational view of the shift assist sensing mechanism and a portion of the shift linkage.

Referring now in detail to FIGS. 2 through 4, the shift sensing mechanism 31 and its association with the lever 32 will be described in detail. It should be noted that the wire transmitter 28 has affixed to its one end a connector which, in turn, is pivotally connected to a pin 36. The pin 36 is received within an inner bushing 37 of a pressure sensitive conductive rubber 38. In the illustrated embodiment, the pressure sensitive conductive rubber 38 is comprised of a pair of conductive plates 39 and 41 that are separated by an elastic body 42. This entire assembly is, then, embedded in a further elastic body 43. When loads are applied to the member 38, the elastic body will deform and the distance between the plates 39 and 41 will change slightly so as to change the resistivity of the unit and this provides a signal which is transmitted from the pressure sensing unit 38 through a pair of conductors 44 to the ignition circuit controller 14. The ignition circuit controller 14 determines when the change of resistivity is such to indicate a shift assist is required and will then slow the engine 12 through misfiring its ignition circuit in any of the well known manners so as to assist shifting.

A pair of spacer washers 45 are disposed between the ends of the connector and the pressure sensing device 38.

It will be seen that a connector 46 connects the end of the wire actuator 34 to a pin 47 that is received in an intermediate slot 48 in the lever 32 so as to transmit the motion. As a result of the aforedescribed construction, the shift sensing device 31 and specifically the pressure sensor 38, which acts like a pressure sensitive type device, will provide a signal when shift resistance is encountered that requires a reduction in engine speed without introducing any lost motion into the system. Of course, such a type of sensor can be placed anywhere in the system, as should be readily apparent to those skilled in the art.

It is to be understood that the foregoing is a description of a preferred embodiment of the invention and that various changes and modifications may be made without departing from the spirit and scope of the invention, as defined by the appended claims.

We claim:

1. A shift assisting mechanism for assisting the shifting of a dog clutch of a transmission driven by an internal combustion engine by reducing the speed of said engine, said transmission comprising a control member selectively movable by an operator for selecting a shift, an actuator for moving said dog clutch to a shift condition, interconnecting means between said control member and said actuator for transmitting motion therebetween, and pressure sensitive conductive rubber means for measuring a predetermined resistance of movement of said dog clutch to its shift position without requiring lost motion for actuating said shift assisting mechanism.

2. A shift assisting mechanism as set forth in claim 1 wherein the pressure sensitive conductive rubber means comprises a pressure gauge.

3. A shift assisting mechanism as set forth in claim 2 wherein the pressure gauge comprises an annular elastomeric member positioned in a joint of the interconnecting means.

4. A shift assisting mechanism as set forth in claim 3 wherein the interconnecting means comprises a pair of wire actuators interconnected by a pivotally supported lever and wherein the annular elastomeric member forms one of the connections to the lever.

5. A shift assisting mechanism as set forth in claim 4 wherein the elastomeric member is in the connection of the control member to the lever.

* * * * *